United States Patent
Drazic et al.

(10) Patent No.: US 9,691,149 B2
(45) Date of Patent: Jun. 27, 2017

(54) PLENOPTIC CAMERA COMPRISING A LIGHT EMITTING DEVICE

(71) Applicant: THOMSON LICENSING, Issy les Moulineaux (FR)

(72) Inventors: Valter Drazic, Betton (FR); Mozhdeh Seifi, Thorigne-Fouillard (FR); Neus Sabater, Betton (FR)

(73) Assignee: THOMSON LICENSING, Issy-les-Moulineaux (FR)

( * ) Notice: Subject to any disclaimer, the term of this patent is extended or adjusted under 35 U.S.C. 154(b) by 0 days.

(21) Appl. No.: 14/953,044

(22) Filed: Nov. 27, 2015

(65) Prior Publication Data
US 2016/0155230 A1 Jun. 2, 2016

(30) Foreign Application Priority Data
Nov. 27, 2014 (EP) .................................... 14306897

(51) Int. Cl.
G06T 7/00 (2017.01)
H04N 5/225 (2006.01)
H04N 5/232 (2006.01)
H04N 17/00 (2006.01)

(52) U.S. Cl.
CPC ......... *G06T 7/0018* (2013.01); *H04N 5/2254* (2013.01); *H04N 5/2256* (2013.01); *H04N 5/23229* (2013.01); *H04N 5/23232* (2013.01); *H04N 17/002* (2013.01); *G06T 2207/10052* (2013.01); *G06T 2207/10148* (2013.01)

(58) Field of Classification Search
CPC ......... G06T 7/0018; G06T 2207/10052; G06T 2207/10148; H04N 5/23232; H04N 5/2254; H04N 5/23229; H04N 17/002; H04N 5/2256
See application file for complete search history.

(56) References Cited

U.S. PATENT DOCUMENTS

| | | | | |
|---|---|---|---|---|
| 8,811,769 B1* | 8/2014 | Pitts | ....................... | H04N 5/225 382/275 |
| 2009/0273843 A1* | 11/2009 | Raskar | ................ | H04N 5/2254 359/601 |
| 2010/0014052 A1* | 1/2010 | Koschmieder | ..... | G02B 17/0621 351/207 |

(Continued)

FOREIGN PATENT DOCUMENTS

| EP | 2403233 | 1/2012 |
|---|---|---|
| WO | WO2013111598 | 8/2013 |

OTHER PUBLICATIONS

Johannsen Etal:"On the Calibration of Focused Plenoptic Camera"—Time-Of-Flight and Depth Imaging. Sensors, Algorithms and Applications. Dagstuhl 2012 Seminar on Time-of-Flight Imaging and GCPR 2013 Workshop on Imaging New Modalities: LNCS 8200—Document Type : Book Chapter; pp. 1-16.
Search Report Dated May 4, 2015.

*Primary Examiner* — Jason Flohre
(74) *Attorney, Agent, or Firm* — Brian J. Dorini; Lily Neff (57) ABSTRACT

A plenoptic camera comprising a camera lens, a lenslet array comprising a plurality of microlenses and a photosensor array. In order to determine reference pixels of sub-images, the camera lens comprises a light emitting device arranged in the aperture stop plane of the camera lens, the light emitting device lighting the photosensor array.

19 Claims, 7 Drawing Sheets

(56) References Cited

U.S. PATENT DOCUMENTS

| | | | |
|---|---|---|---|
| 2010/0141572 A1* | 6/2010 | Kamada | G02B 6/0008 |
| | | | 345/102 |
| 2010/0141802 A1* | 6/2010 | Knight | H04N 5/23212 |
| | | | 348/240.3 |
| 2010/0265385 A1 | 10/2010 | Knight et al. | |
| 2012/0242855 A1* | 9/2012 | Nagasaka | H04N 5/225 |
| | | | 348/222.1 |
| 2012/0243101 A1 | 9/2012 | Nagasaka et al. | |
| 2013/0010260 A1* | 1/2013 | Tumlinson | H04N 5/225 |
| | | | 351/206 |
| 2013/0208241 A1* | 8/2013 | Lawson | A61B 3/0091 |
| | | | 351/206 |
| 2014/0016827 A1 | 1/2014 | Yamamoto et al. | |
| 2014/0055575 A1 | 2/2014 | Imamura et al. | |
| 2014/0146184 A1 | 5/2014 | Meng et al. | |
| 2014/0192237 A1* | 7/2014 | Ikedo | H04N 5/367 |
| | | | 348/246 |
| 2014/0375788 A1* | 12/2014 | Gabara | H04N 13/0484 |
| | | | 348/78 |

* cited by examiner

PLENOPTIC CAMERA COMPRISING A LIGHT EMITTING DEVICE

This application claims the benefit, under 35 U.S.C. §119 of European Patent Application No. 14306897.1, filed Nov. 27, 2014.

1. TECHNICAL DOMAIN

The present disclosure relates to the domain of plenoptic camera and light-field acquisition devices and methods. The present disclosure also relates to the domain of calibrating a plenoptic camera.

2. BACKGROUND ART

Figure 1:
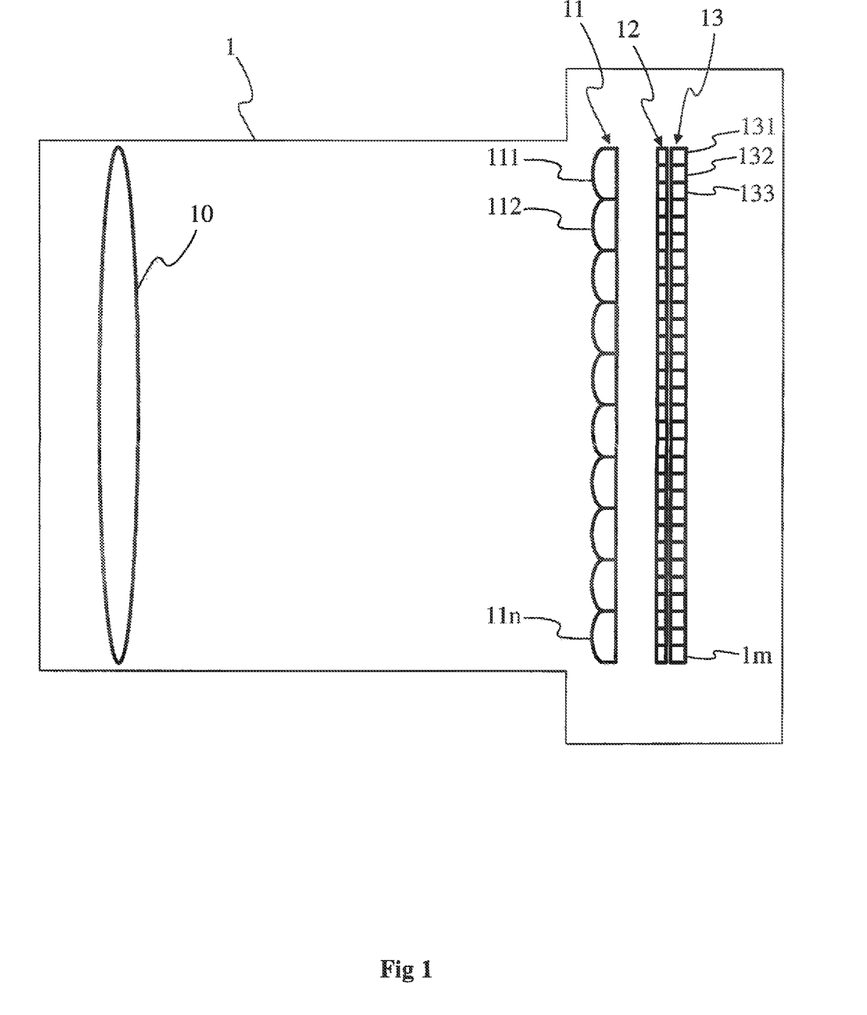
FIG. 1 shows a plenoptic camera, according to the background art.

According to the background art, it is known to acquire different views of a same scene with a plenoptic camera, also called light-field camera. FIG. 1 illustrates such a plenoptic camera 1 according to prior art. The plenoptic camera 1 is composed of a lens arrangement associated with a photosensor array 13, also called image sensor array 13. The photosensor array 13 comprises a large number m of photosensors 131, 132, 133 to 1m arranged in the form of a grid of X columns and Y lines, m corresponding to X time Y. A color filter array (CFA) 12 is arranged on the photosensor array 13. The CFA 12 typically arranges RGB (Red, Green and Blue) color filters on the photosensor array, the RGB arrangement taking for the example the form of a Bayer filter mosaic. Typically, one color filter (red, green or blue filter) is associated with one photosensor according to a predetermined pattern, which comprises 50% green, 25% red and 25% blue in the example of a Bayer filter, such a pattern being also called RGBG, GRGB or RGGB pattern. The lens arrangement comprises a primary lens 10, also called main lens, and a lenslet array 11, which comprises a plurality of n microlenses 111, 112, 1n, n being a positive integer greater than or equal to 2. The microlenses 111, 112, 1n are arranged in such a way as to be optically each associated with a plurality of photosensors. The number of photosensors optically associated with one microlens corresponds to the number of views of the scene acquired with the plenoptic camera 1. The photosensors associated with a given microlens form a microlens micro-image. To obtain the different views, the raw image (i.e. the color sensor data acquired with the photosensor array 13) is demosaiced and demultiplexed. The demosaicing enables to recover a full color raw image, i.e. to recover full color information (for example RGB information, RGB standing for "Red", "Green" and "Blue") for the pixels of the raw image while the raw image acquired with the plenoptic image associates only one color component (R, G or B for example) with each pixel. The demultiplexing performed after the demosaicing enables to recover the different views of the scene, i.e. to group the pixels of the demosaiced raw image according to the view they belong to.

To recover the different views of the scene, it is necessary to calibrate the raw image acquired with the plenoptic camera. The main goal of this calibration is to identify centre point locations of each microlens micro-image formed on the photosensor array of the plenoptic camera. Due to various complications, the process pertaining to the identification of the center point location is plagued by various issues leading to mismatches between the estimated centers all over the photosensor array with the single location of the main lens sub-aperture which is supposed to be optically conjugated with those central pixels. If the photosensor array is provided with a Bayer type Color Filter Array (CFA), it impacts even more the precision of the estimation. If a global optimization is used to estimate the centers, such an optimization typically cannot take into account fabrication dispersion of individual microlenses in size and relative positions in the lenslet array. Moreover there is an ambiguity in the estimation of the center if the estimated position falls in the vicinity of the border between some pixels/photosensors: the nearest integer rounding to select the right pixel has a great probability to select a pixel which is not the central pixel of the micro-image.

Moreover, each time the main lens has undergone a change, either in zooming or in focalization, the micro-image centers have to be estimated again. For that reason, a flat white picture with the same lens settings has to be taken and from that image a least square optimization method used to retrieve the parameters needed to demultiplex the views. This creates an inconvenience because it is not very handy to calibrate the system each time the main lens has been tweaked for a snapshot. If the system is also video capable, this means also that zooming while filming is also prohibited.

3. SUMMARY

The purpose of the present disclosure is to overcome at least one of these disadvantages of the background art.

The present disclosure relates to a plenoptic camera comprising a camera lens, a lenslet array comprising a plurality of microlenses and a photosensor array, wherein the camera lens comprises a light emitting device arranged in the aperture stop plane of the camera lens, the light emitting device lighting the photosensor array.

According to a particular characteristic, the light emitting device is arranged at the centre of said aperture stop plane.

Advantageously, the light emitting device is transparent.

According to a specific characteristic, the plenoptic camera comprises a device for detecting a change of at least a parameter of said camera lens.

Advantageously, the detecting of a change of at least a parameter triggers lighting the photosensor array by the light emitting device.

According to another characteristic, the light emitting device lights the photosensor array during at least a part of at least an image acquisition cycle.

Advantageously, the light emitting device emits white light.

According to a specific characteristic, the light emitting device emits red light, green light and blue light successively.

According to another characteristic, the light emitting device is a light-emitting diode.

The present disclosure also relates to a method of calibrating a plenoptic camera, the plenoptic camera comprising a camera lens, a lenslet array comprising a plurality of microlenses and a photosensor array, the method comprising:

- lighting the photosensor array with a light emitting device arranged in the aperture stop plane of the camera lens,
- determining photosensors of the photosensor array lit by the light emitting device,
- calibrating the plenoptic camera according to the determined photosensors.

Advantageously, the method further comprises detecting a change of at least a parameter of the camera lens, the lighting being triggered by the detecting.

According to a specific characteristic, the photosensor array is lit during at least a part of at least an image acquisition cycle.

According to another characteristic, the determining comprises measuring light intensity received by each photosensor of the photosensor array, the determined photosensors corresponding to the photosensors for which the measured light intensity is maximal.

Advantageously, one photosensor is determined for each microlens of the lenslet array.

According to a specific characteristic, the photosensor determined for each microlens corresponds to the centre pixel of a micro-image associated with the microlens.

The invention also relates to a telecommunication device comprising the plenoptic camera.

4. LIST OF FIGURES

The present disclosure will be better understood, and other specific features and advantages will emerge upon reading the following description, the description making reference to the annexed drawings wherein.

5. DETAILED DESCRIPTION OF EMBODIMENTS

The subject matter is now described with reference to the drawings, wherein like reference numerals are used to refer to like elements throughout. In the following description, for purposes of explanation, numerous specific details are set forth in order to provide a thorough understanding of the subject matter. It can be evident, however, that subject matter embodiments can be practiced without these specific details.

According to a particular embodiment of the present principles, the optical assembly of a plenoptic camera comprises a light emitting device, i.e. a light source, arranged in the aperture stop plane of the camera lens (also called main lens or primary lens) of the optical assembly. The light emitting device is arranged in such a way to light the photosensor array of the plenoptic camera. For sake of simplicity, drawings illustrate only one lens to illustrate the main lens. It is naturally understood that the main lens could comprise a set of several lenses.

Lighting the photosensor array with the light emitting device during a determined period of time (for example during a period of time corresponding to the time period needed for acquiring a raw image of the scene or corresponding to only a part of the time period needed for acquiring the raw image) enables selection of at least one photosensor of the photosensor array under each microlens. The selected photosensor for a given microlens may then be used as a reference photosensor (or pixel) to collect the pixels associated with the different views during the demosaicing of the raw image.

It is understood with aperture stop plane of the camera lens, the plane of the physical device(s) (lens(es) and/or a diaphragm) limits the cone of light passing through the camera lens. The plane of the aperture stop is a determined plane (depending from the design of the camera lens) where a diaphragm, or more generally speaking an aperture stop, would be positioned to limit the cone of light passing through the camera lens.

Figure 2:
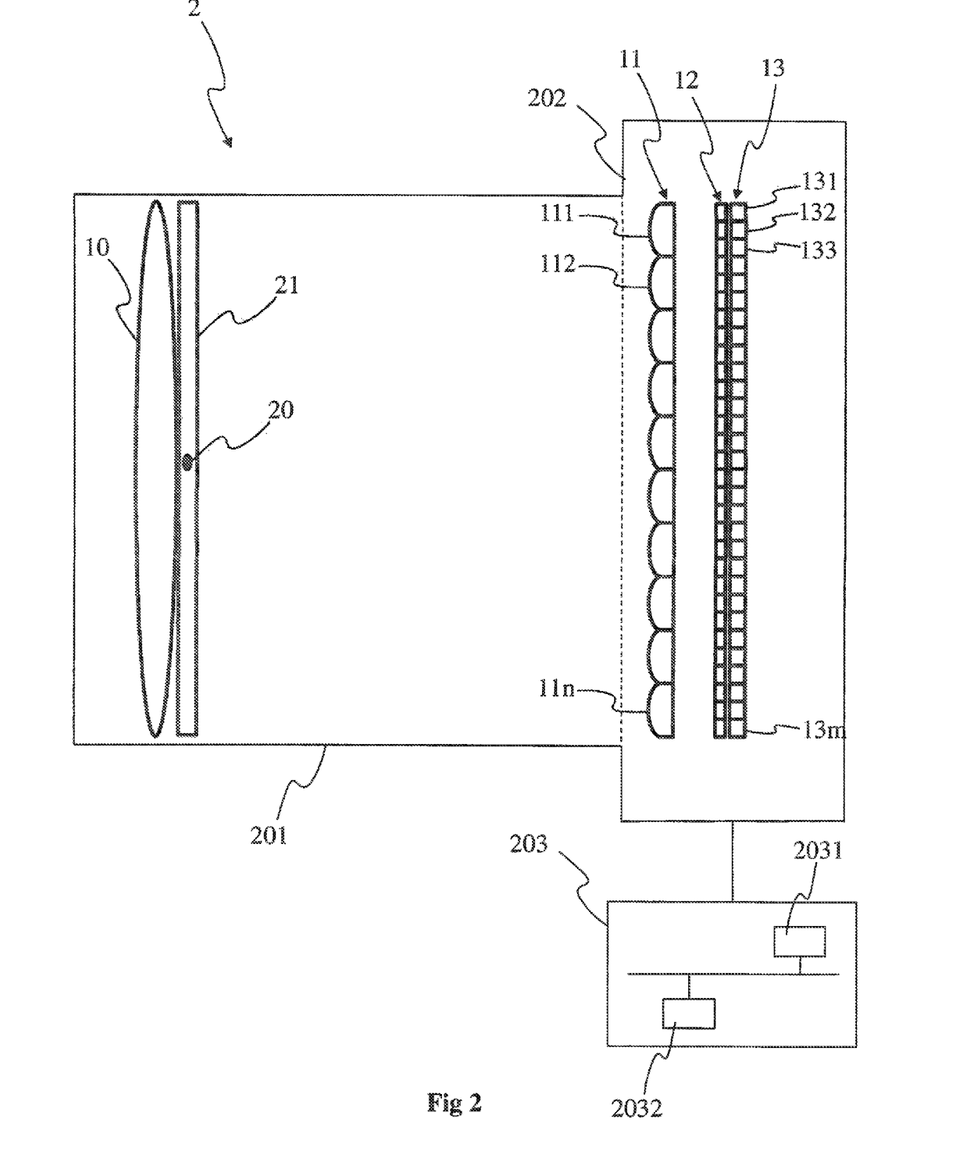
FIG. 2 shows a plenoptic camera, according to a particular embodiment of the present principles.

FIG. 2 shows a plenoptic camera 2 according to a particular embodiment of the present principles. The plenoptic camera comprises a lens unit 201 (corresponding to an optical assembly) and a camera body 202.

The lens unit 201 is advantageously adapted to be associated with a camera body 202. The camera body 202 comprises a photosensor array 13, which comprises a plurality m of photosensors 131, 132, 133 to 13*m*. Each photosensor corresponds to a pixel of the raw image of the scene acquired with the photosensor array, with each pixel encompassing a part (also called a point) of the scene. For purposes of illustration, the photosensor array 13 is shown with a relative small number of photosensors 131 to 13*m*. Naturally, the number of photosensors is not limited by the illustration of FIG. 2 but extends to any number of photosensors, for example several thousand or several millions of photosensors. For example in a 12.4 megapixel camera, a pixel will correspond to a photosensor (e.g. corresponding to an array of 4088×3040 pixels/photosensors). A color filter array (CFA) 12 is arranged on the photosensor array 13. The CFA 12 typically arranges RGB (Red, Green and Blue) color filters on the photosensor array, the RGB arrangement taking for the example the form of a Bayer filter mosaic. According to a variant, a CFA is arranged on the lenslet array 11 (in addition to the CFA 12 or in replacement of the CFA 12). For associating the lens unit 201 with the camera body 202, the lens unit 201 comprises a first attaching part and the camera body 202 comprises a second attaching part, the first and second attaching parts being compatible. Thanks to the first and second attaching parts, the lens unit 201 may be clipped onto the camera body 202 or the lens unit 201 may be screwed with the camera body 202. An example of such first and second attaching parts of a lens unit configured to be associated with a camera body may be found in the Japanese patent application JP2013-105151A, which was published on May 30, 2013. The first and second attaching parts are configured in such a way that, once the lens unit 201 and the camera body 202 have been put together, the lens unit 201 and the camera body 202 form a plenoptic camera configured for acquiring multiple views of a scene at each acquisition of the scene. To this end, the camera body 202 also comprises a lenslet array 11 comprising n microlenses 111, 112, 11*n*, *n* being an integer greater than or equal to 2. For purposes of illustration, the lenslet array 11 is shown with a relative small number of microlenses, but the number of microlenses may extend up to several thousand or even one or several million of microlenses. A group of photosensors of the photosensor array 13 are optically associated with each microlens 111 to 11*n* of the lenslet array 11. For example, each microlens 111 to 11*n* of the lenslet array 11 is sized to correspond to an array of 2×1, 4×4 or 10×10 photosensors. A group of photosensors associated with a microlens (or said differently, a group of photosensors under the microlens) form a micro-image associated with this microlens, each photosensor of the group of photosensors forming a pixel of the micro-image. Each photosensor of the plurality of photosensors optically associated with one single microlens enables to acquire raw data representative of a pixel of the scene according to one position (acquisition of as many parallaxes as pixels). According to a variant, the lens unit 201 and the camera body 202 form one single body and are assembled without being detachable.

The lens unit 201 comprises a camera lens 10, also called a main lens or primary lens, which is advantageously formed of one or more lens elements, only one lens element 10 being depicted in FIG. 2 for clarity purpose. The lens unit 201 also comprises a light emitting device (LED) or a light source 20 arranged in the aperture stop plane of the camera lens 10. The LED 20 may be for example a laser, a light-emitting electrochemical cell (LEC or LEEC), a white-light-emitting diode (WLED), an organic light-emitting diode (OLED) or a quantum dot light-emitting diode. A WLED may for example take the form of a RGB (Red, Green, Blue) system where the white light is obtained by mixing differently color lights (also called multi-color white LED), for example with a LED system integrating a blue LED, a green LED and a red LED. According to another example, the WLED may be a phosphor-based LED, for example a blue LED coated with phosphor to form white light. The LED 20 is advantageously embedded in a transparent glass plate 21. According to a variant, the LED 20 is kept into position with any means, for example with a tripod, each bracket of the tripod being advantageously made of transparent material (for example made of ITO (Indium-Tin-Oxide) or of transparent cellulose film or of thin silver hexagonal grids). The LED 20 itself is advantageously transparent (e.g. a TOLED (Transparent Organic Light-Emitting-Diode)), which means that when not lighting, the LED let light reaching it passing through it, for example the LED 20 let 85%, 90%, 95% or even more of the light coming to it passing through it. The glass plate embedding the LED or the brackets maintaining the LED may be advantageously coated with a transparent conducting film (TCF) which is electrically conductive and optically transparent to supply the LED with electricity. TCF may be made from both inorganic and organic materials. Inorganic films typically are made up of a layer of transparent conducting oxide (TCO), generally in the form of indium tin oxide (ITO), fluorine doped tin oxide (FTO), and doped zinc oxide. Organic films are for example made with carbon nanotube networks and graphene, which can be fabricated to be highly transparent to infrared light, along with networks of polymers such as poly(3,4-ethylenedioxythiophene) and its derivatives.

The LED 20 is arranged in the aperture stop plane of the camera lens and advantageously positioned at the center of the aperture stop plane of the camera lens 10. According to a variant, the LED 20 is arranged in the aperture stop plane of the camera lens 10 but in a location different from the center of the aperture stop plane.

The LED 20 advantageously faces the rear side of the plenoptic camera2, toward the photosensor array 13 in a way to light the photosensor array 13 when emitting light. The lateral dimension of the LED 20 is advantageously small enough so that its image on the photosensor array 13 by the microlenses 111 to 11n is equal or smaller than one photosensor/pixel, or is at least the smallest possible even if greater than one photosensor. Then when the LED 20 shines light toward the photosensor array 13, it will lit only one pixel of each micro-image associated with each microlens, that may be used as a reference pixel to locate the sub-images formed on the photosensor array 13 and to then collect the pixels for the different views when demosaicing the raw image acquired with the plenoptic camera 2.

The plenoptic camera 2 advantageously comprises a hardware module 203 configured for detecting a change in one or more parameters of the camera lens 10, for example a change of the focal length of the camera lens and/or a change of the focussing distance occurring when focalizing or zooming. The hardware module may be also advantageously configured to trigger the lighting of the photosensor array 13 by the LED 20 when a change in at least one of the parameters of the camera lens 10 has been detected and/or when powering up the plenoptic camera 10. The module may be comprised in the camera body 202 or advantageously in the lens unit 201. The module advantageously comprises one or several processors 2031 associated with a memory, for example Random Access Memory or RAM 2032 comprising registers. The memory stores instructions of an algorithm implementing the method of detecting the change of parameter(s) of the camera lens and/or triggering the lighting by the LED 20 when a change in at least one of the parameters of the camera lens 10 has been detected and/or when powering up the plenoptic camera 10. According to a variant, the module takes the form of a programmable logical circuit of type FPGA (Field-Programmable Gate Array) for example, ASIC (Application-Specific Integrated Circuit) or a DSP (Digital Signal Processor). The module may also comprise an interface configured to receive and transmit data such as control parameters input by a user via a user interface to set parameters impacting the control of the LED 20 (for example lighting intensity, duration of the lighting).

Figure 3:
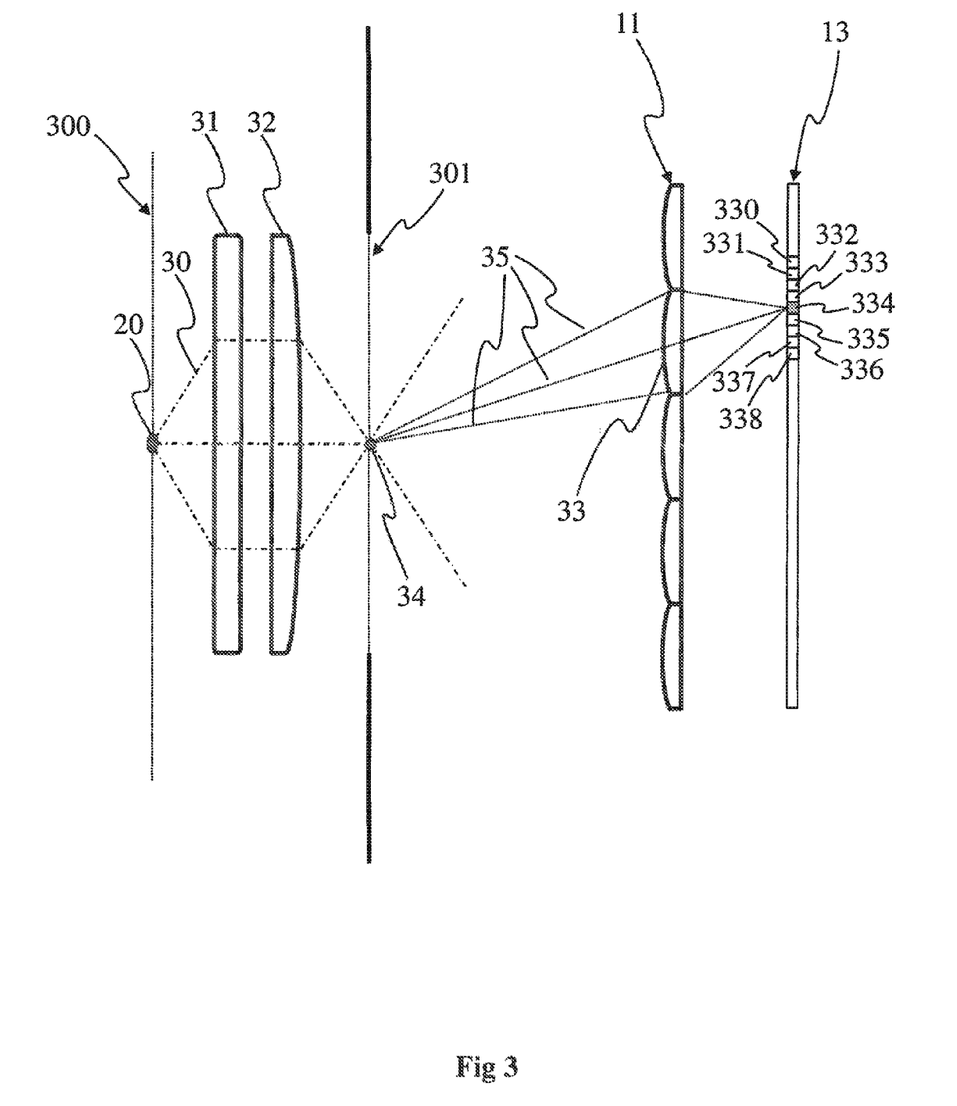
FIG. 3 shows a light rays bundle emitted by a light emitting device of the plenoptic camera of FIG. 2, according to a particular embodiment of the present principles.

FIG. 3 shows the bundle 30 of rays of light emitted by the light emitting device 20, according to an exemplary and non-limiting embodiment of the present principles. According to the example of FIG. 3, the LED 20 is located at the level of the optical centre of the camera lens in the aperture stop plane of the camera lens. The light emitted by the LED 20 is illustrated with a cone of light shown with dash-dot lines 30. The cone of light 30 passes through rear lens elements 31, 32 of the camera lens to concentrate on a point 34 corresponding to the image of the LED 20 formed onto the exit pupil 301. Rear lens elements 31 and 32 correspond to lens elements of the camera lens 10 located between the aperture stop plane 300 and the exit pupil 301. Naturally, the number of real lens elements is not limited to 2 but extend to any integer greater than or equal to 0. For sake of clarity, only a part 35 of the light rays emitted by the LED 20 and having passed through the rear lens elements 31, 32 are illustrated on FIG. 2, namely the light rays passing through the microlens 33. The bundle of rays of light 35 passing through the microlens 33 are illustrated with dotted lines. These rays of light 35 advantageously concentrate onto one or several photosensors 334 (for example 3, 4 or 5 photosensors) of the photosensor array 13. As the LED 20 is located at the level of the optical centre in the aperture stop plane 300 of the camera lens, the photosensor corresponding to the centre pixel of the micro-image associated with (under with) the microlens 33 receiving the maximum light intensity among the group of photosensors 332, 333, 334, 335, 336, 337, 338 associated with the microlens 33. When several photosensors are hit by the light rays 35, the photosensor receiving the maximum light intensity is selected as being the reference photosensor/pixel for the micro-image associated with the microlens.

Figure 4:
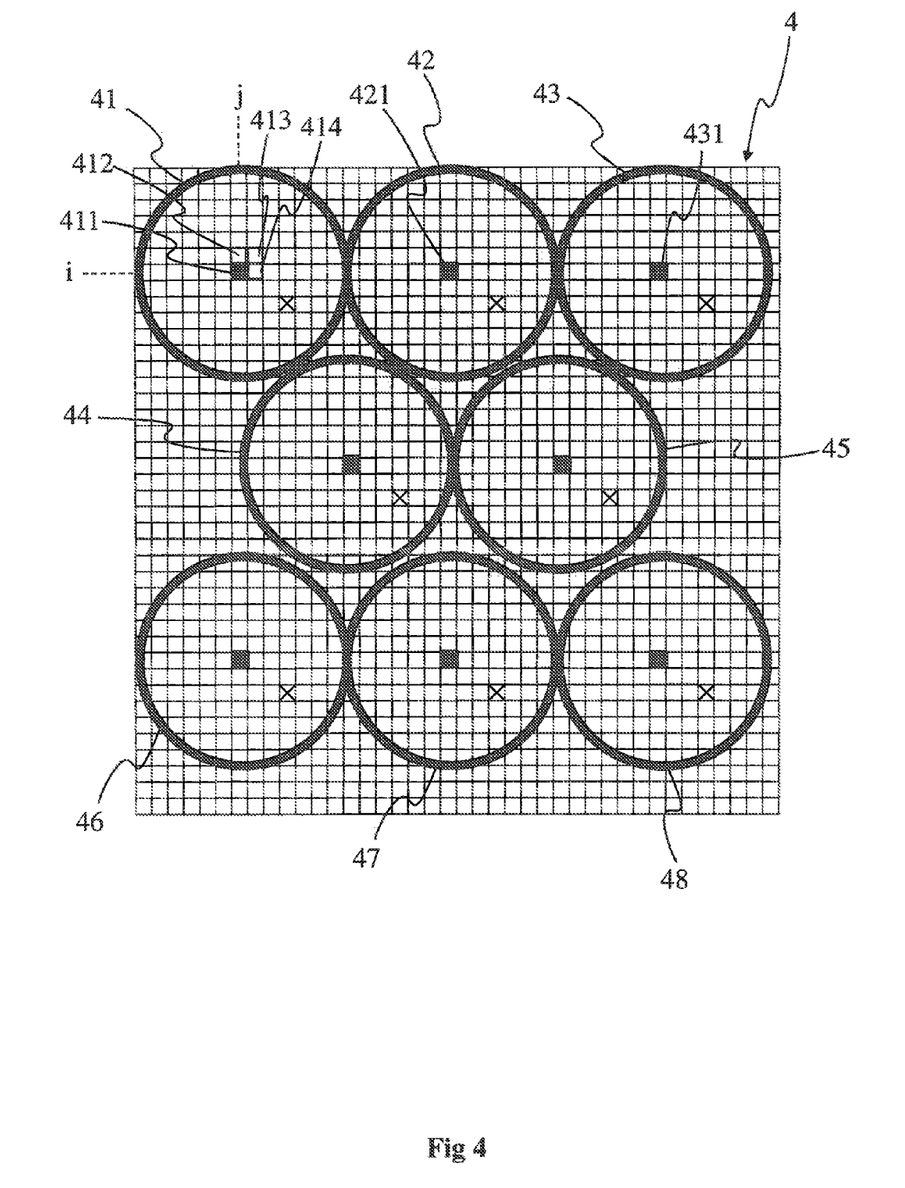
FIG. 4 shows micro-images associated with microlenses of the lenslet array of the plenoptic camera of FIG. 2, according to a first particular embodiment of the present principles.

FIG. 4 shows micro-images associated with microlenses of the lenslet array 11, according to a first particular embodiment of the present principles. Only a part of the microlenses of the lenslet array 11 are represented on FIG. 4, i.e. microlenses 41, 42, 43, 44, 45, 46, 47 and 48. More specifically, FIG. 4 illustrates the projection 4 of the photosensor array 13 onto the lenslet array, which enables to visualize the photosensors of the photosensor array associated with each microlens 41 to 48. Photosensors associated with a given microlens correspond to the photosensors, which are under the given microlens, i.e. the photosensors projecting onto the area covered by the given microlens. Each photosensor of the group of photosensors associated with a given microlens corresponds to a pixel of the micro-image associated with this microlens. The photosensors lit by the LED 20 are highlighted in black or light grey for each microlens. For example, the photosensors associated with the microlens 41 and lit by the LED 20 correspond to photosensors 411, 412, 413 and 414. To determine the reference photosensor among the group of photosensors 411 to 414 lit by the LED 20, the amounts of light received by each photosensor 411 to 414 are compared with each other and the photosensor having the maximum value is selected as being the reference photosensor, corresponding to the reference pixel of the micro-image associated with the microlens 41. If only one photosensor is lit by the LED (for example photosensors 421 and 431 respectively associated with the microlenses 42 and 43), then the reference photosensor for the microlens is the single photosensor lit by the LED. Reference photosensors for each microlens 41 to 48 are shown in black. The example of FIG. 4 corresponds to the exemplar embodiment of FIG. 3 where the LED 20 is arranged in the optical centre of the aperture stop plane of the camera lens. According to this example, for each microlens 41 to 48, the photosensor receiving the maximum of the light emitted by the LED 20, called reference photosensor or reference pixel of the micro-image associated with said each microlens, corresponds to the centre photosensor of the group of photosensors associated with this microlens.

Knowing the boundaries of each micro-image associated with each microlens and the reference pixel of each micro-image, it is possible to collect any pixel in each micro-image to associate them with the right views. Indeed, the number of views acquired with a plenoptic camera in a single snapshot corresponds to the number of photosensors associated with one microlens. To build a given view, it is necessary to select the right pixel in each micro-image associated with the microlenses. Such a process, called demultiplexing, is performed by using the reference pixel determined as explained hereinabove, according to one embodiment of the present principles. The demultiplexing process consists in reorganizing the pixels of the raw image in such a way that all pixels capturing the light rays with a certain angle of incidence are stored in the same image creating the so-called views, also called sub-aperture views. The angular information of the light rays is given by the relative pixel positions in the micro-images with respect to the position of the reference pixel in each micro-image. Pixels under each microlens at the same relative position with regard to the reference pixel of each micro-image associated with each microlens belong to the same view. The pixels of a micro-image associated with a microlens form a grid of pixels with R rows and C columns, for example, with R and C being integer numbers. The coordinates of the pixels of a micro-image are given with the row number and column number of the pixels. For the micro-image under the microlens 41, the coordinates of the reference pixel 411 are for example (i,j). The same is true for each reference pixel of each micro-image under each microlens. For example, the coordinates of the reference pixel 421 are also (i,j) in the micro-image under the microlens 42 and the coordinates of the reference pixel 431 are also (i,j) in the micro-image under the microlens 43, the number of pixels being the same for each micro-image as well as the numbers R and C of rows and columns in each micro-image. To build a determined view, all pixels having the same coordinates in each micro-image are selected. For example, pixels referring to a same view have been identified with a cross on FIG. 4, the coordinates of each pixel identified with a cross being (i+3,j+3) in each image with regard to the coordinates (i,j) of the reference pixel of each micro-image.

Boundaries of the micro-images are for example determined by acquiring a white scene or a grey uniform scene. The micro-images have the same distribution as the distribution of the microlenses. By acquiring an image of a white or grey scene, pixels under a microlens appear lighter than pixels not located under a microlens. Micro-images gather pixels appearing light on the photosensor array and have the same form as the form of the microlenses. Boundaries of the micro-images may for example have been determined once for all when manufacturing the plenoptic camera, information representative of the boundaries being for example stored in a memory (for example a RAM) of the plenoptic camera. According to a variant, the boundaries of the micro-images may be determined by using the reference pixels when the reference pixels correspond to centre pixels as in the example of FIG. 4, knowing the form of the microlenses. By taking the middle of a segment line having for extremities the centre pixels of two adjacent micro-images, the size of a micro-image may be easily determined. For example, if the microlens associated with the micro-image is circular, the radius of the micro-image corresponds to the number of pixels between the centre pixel and the pixel located at the middle of the segment line having for extremities the centre pixels of two adjacent micro-images.

Figure 5:
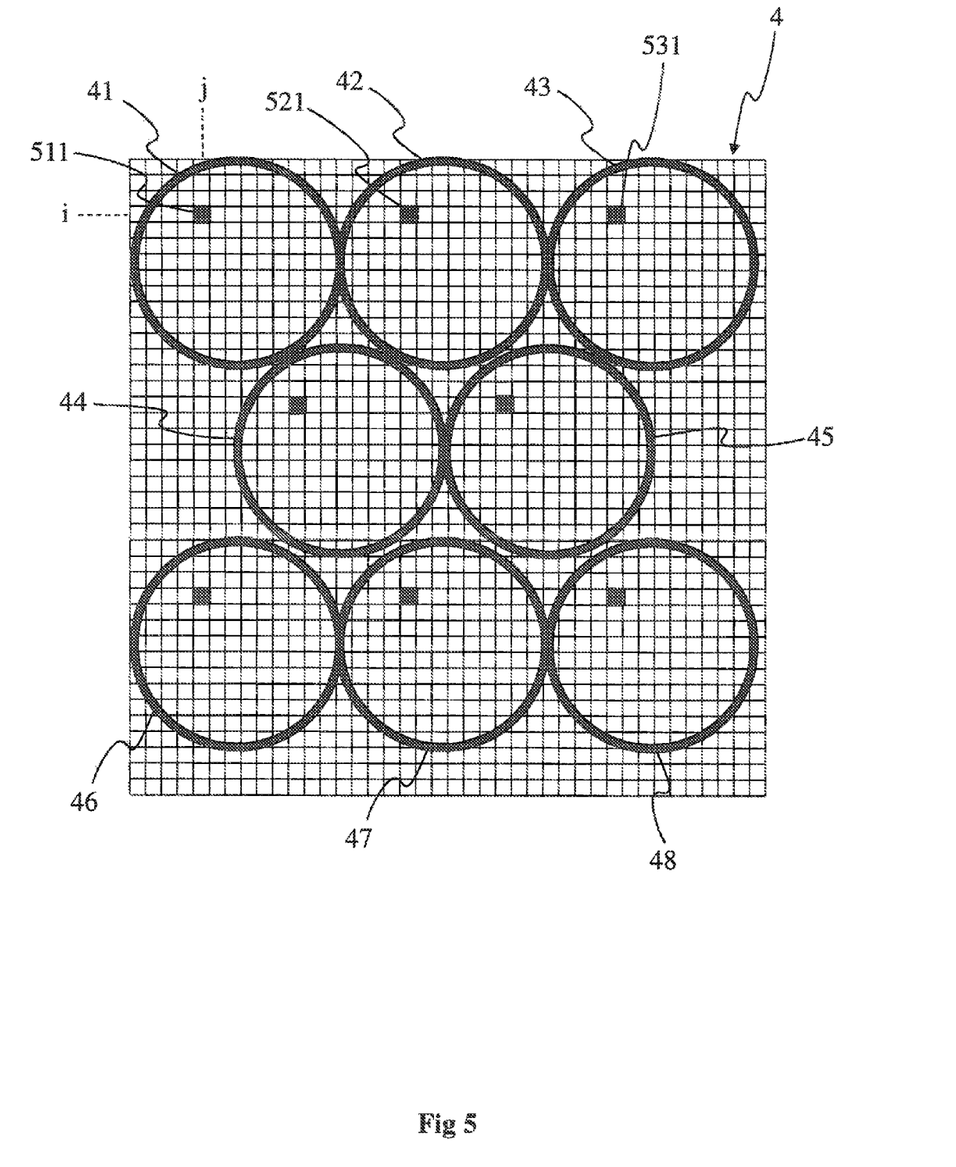
FIG. 5 shows micro-images associated with microlenses of the lenslet array of the plenoptic camera of FIG. 2, according to a second particular embodiment of the present principles.

FIG. 5 shows micro-images associated with microlenses of the lenslet array 11, according to a second particular embodiment of the present principles. The microlenses 41 to 48 of FIG. 5 correspond to the microlenses of FIG. 4 but the reference pixels of each micro-image of FIG. 5 are different from the reference pixels of the micro-images represented on FIG. 4. According to the example of FIG. 5, the reference pixels 511, 521 and 531 are each located in the left upper part of the micro-images associated with the microlenses 41, 42 and 43 respectively. This specific embodiment corresponds to a situation where the LED 20 is not located at the optical centre in the aperture stop plane of the camera lens but at a distance from the optical centre in the aperture stop plane. More specifically, the position of the LED according to the example of FIG. 5 is the left upper part of the aperture of the camera lens in the aperture stop plane, just like the position of the reference pixels in the micro-images associated with the microlenses 41 to 48. Naturally, the LED 20 remains in the aperture of the camera lens to be able to light the photosensor when emitting light. The demultiplexing process is performed in a same way as the one described with regard to FIG. 4, only the position of the reference pixels being different from the exemplary embodiment of FIG. 4.

Figure 6:
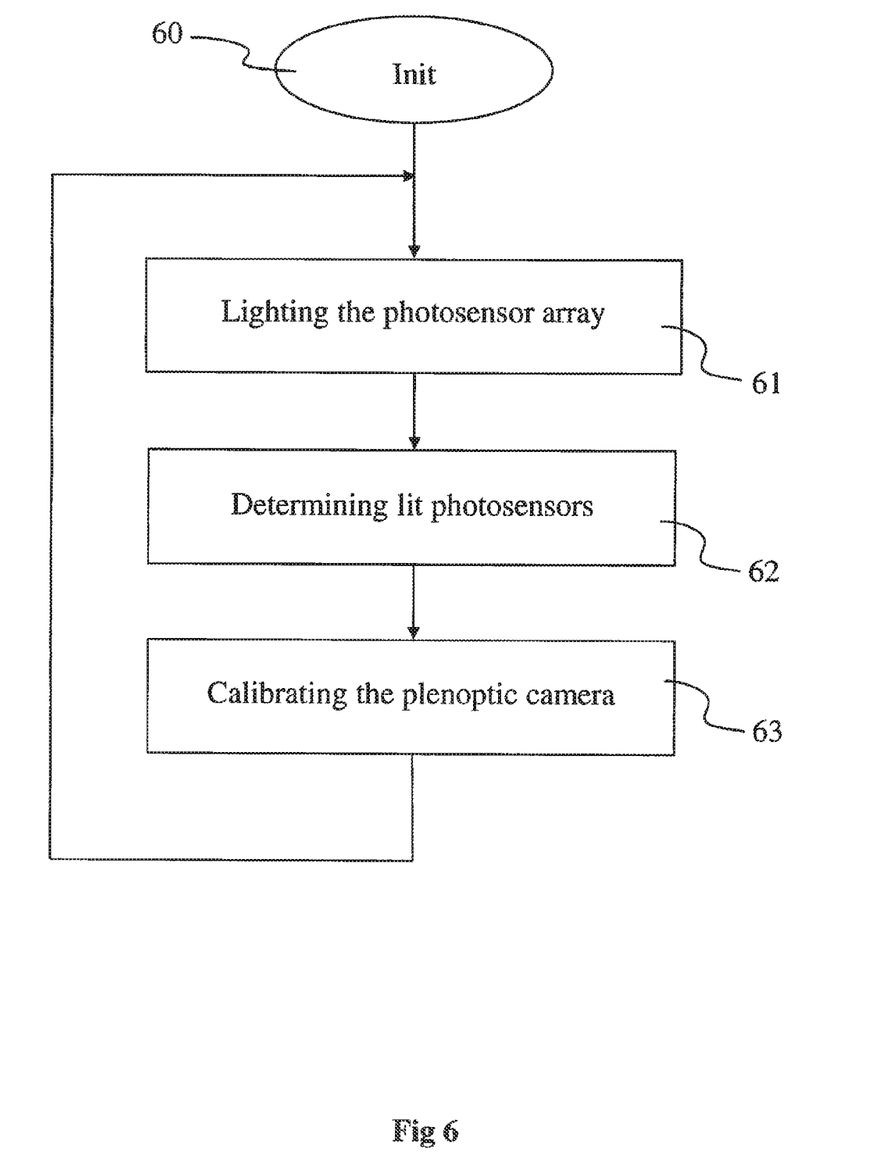
FIG. 6 shows a method of calibrating the plenoptic camera of FIG. 2, according to a particular embodiment of the present principles.

FIG. 6 shows a method of calibrating the plenoptic camera 2, according to an illustrative and non-limiting embodiment of the present principles.

During an initialisation step 60, the different parameters of the plenoptic camera, notably the parameters of the camera lens and the parameters representative of the reference pixels, are updated. The parameters are for example initialized when powering up the plenoptic camera and/or when changing the parameter of the camera lens, for example the focal length, when zooming or focalizing.

Then during a step 61, the photosensor array of the plenoptic camera is lit during a determined period of time by a light emitting device (LED) arranged in the aperture stop plane of the camera lens of the plenoptic camera. The LED is advantageously arranged in the centre of the aperture stop plane. According to a variant, the LED is arranged at any position in the aperture stop plane but in the aperture of the camera lens of the plenoptic camera to be able to light the photosensor array.

The duration of light emission corresponds for example to an image acquisition cycle, i.e. to the time duration needed to acquire a raw image of a scene with the plenoptic camera. According to a variant, the duration of light emission by the LED is less than an image acquisition cycle, for example 20%, 30% or 50% of the image acquisition cycle. Lighting the photosensor array during a time period less than the image acquisition cycle enables to capture light coming from the scene during the remaining time of the image acquisition cycle, which enable to acquire raw data even for the photosensors "covered" by the LED, the LED being advantageously transparent when not emitting light.

The emission of light by the LED is for example triggered when powering up the plenoptic camera and/or when a parameter of the camera lens, such as the focal length, has been modified (for example when zooming or focalizing).

Then, during a step 62, the photosensors of the photosensor array lit by the rays of light emitted by the LED are identified. At least one photosensor is lit in each group of photosensors associated with and lying under a microlens. The size of the LED is advantageously chosen in such a way that the light beam emitted by the LED hits only one photosensor after having passed through the rear lens element(s) of the camera lens and the microlenses of the microlens array. The size of the LED is advantageously such that its image on the photosensor array is equal to the size of one photosensor, which corresponds to the size of one pixel of a micro-image associated with a microlens or to the size of a pixel belonging to a view obtained by demultiplexing the raw image acquired with the plenoptic camera. If more than one photosensor is lit in a group of photosensor under a microlens (for example if the size of the image of the LED is greater than the size of a pixel or if convergence issues occur, for example due to lenslet manufacturing tolerances and/or optical distortion of the plenoptic system), then one of the photosensors hit by the light beam has to be determined/selected. The photosensor selected among the plurality of lit photosensors corresponds advantageously to the photosensor receiving the maximum light intensity. To that aim, the quantities of light received by each photosensor lit by the LED are compared with each other and the maximum value is selected. As a result of step 62, one single photosensor under each microlens is selected, the selected photosensor for a determined microlens corresponding to the reference pixel of the micro-image associated with this determined microlens.

Then, during a step 63, the plenoptic camera is calibrated based on the selected photosensors which are used as reference pixels for each micro-image. Calibration consists in identifying the reference pixel in each microlens micro-image, the reference pixel corresponding for example to the centre pixel of the micro-image. Once the reference pixels have been identified, the demultiplexing process may be initiated to build the different views of the scene acquired with the plenoptic camera by reorganizing the pixels of the raw image.

In an optional step, the view corresponding to the reference pixels is reconstructed in a post-processing step. Indeed, the reference pixels lit by the LED correspond to a view of the scene according to a specific viewing angle. If the photosensors corresponding to these reference pixels are lit by the LED during a whole image acquisition cycle, no raw data is available for these pixels and the corresponding view is lost. For example, in the case where a video is acquired with the plenoptic camera, for example at a frame rate of 24 images per second, the LED may light the photosensor during one of the 24 image acquisition cycle, which means that the view corresponding to the lit photosensors will be lost but only for one of the 24 images. The lost view may then be advantageously reconstructed by temporal interpolation of the same view (i.e. corresponding to a same viewing angle) to form one or several of the 23 remaining images. According to a variant, all views corresponding to the image among the 24 images used for calibrating the plenoptic camera (i.e. for determining the reference pixels of the micro-images) are removed from the stream of views output from the plenoptic camera, only the views associated with the 23 remaining images being considered, for example stored in a memory or displayed on a screen.

In a further optional step, the level of brightness of the view corresponding to the pixels of the micro-images "covered" by the LED when the LED does not light the photosensor array may be corrected. Indeed, even if the LED is essentially transparent in the "off" state (i.e. the state when the LED does not light the photosensor array), the material used to manufacture the LED may filter a part of the light passing through the LED and thus reaching the corresponding photosensors on the photosensor array, especially with regard to the surrounding photosensors which are not "covered" by the LED. To correct this brightness difference between the photosensors, the transparency of the LED may be determined as a function of the wave length (color) of the LED before integrating the LED into the lens unit, and a corrective gain may be applied for the lit pixel.

Figure 7:
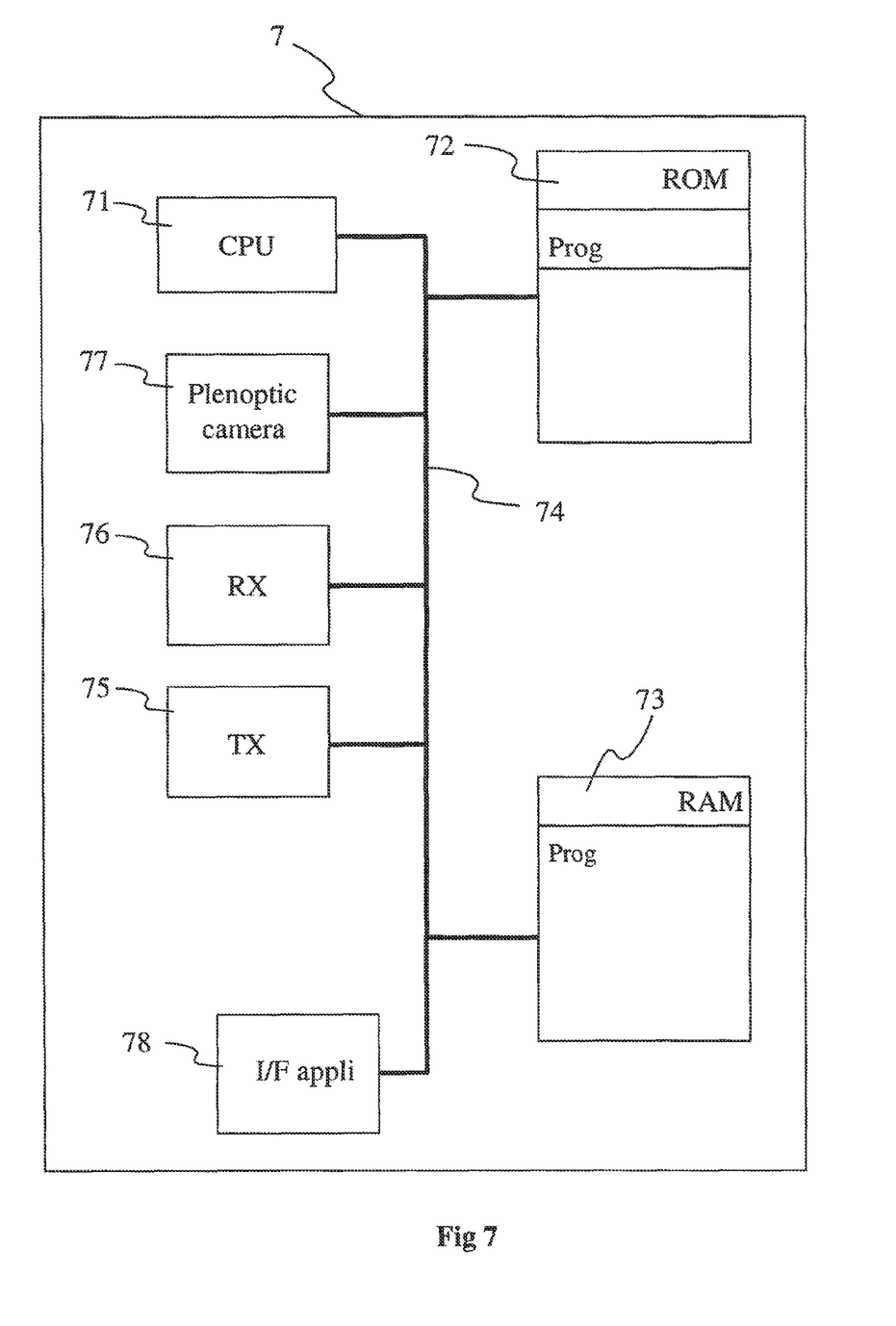
FIG. 7 shows a telecommunication device comprising the plenoptic camera of FIG. 2, according to a particular embodiment of the present principles.

FIG. 7 diagrammatically illustrates a hardware embodiment of a telecommunication device 7, corresponding for example to a smartphone or a tablet that embodies a plenoptic camera in accordance with an aspect of the present principles.

The telecommunication device 7 comprises the following elements, connected to each other by a bus 74 of addresses and data that also transports a clock signal:
- a microprocessor 71 (or CPU),
- a non-volatile memory of ROM (Read Only Memory) type 72,
- a Random Access Memory or RAM 73,
- a radio interface 76,
- an interface 75 adapted for the transmission of data,
- a plenoptic camera 77, corresponding for example to the plenoptic camera 2 of FIG. 2,
- an MMI interface 78 adapted for displaying information for a user and/or inputting data or parameters.

It is noted that the word "register" used in the description of memories 72 and 73 designates in each of the memories mentioned, a memory zone of low capacity as well as a memory zone of large capacity (enabling a whole programme to be stored or all or part of the data representing data received and decoded).

The memory ROM 72 comprises in particular a "prog" program.

The algorithms implementing the steps of the method specific to the present disclosure and described below are stored in the ROM 72 memory associated with the telecommunication device 7 implementing these steps. When powered up, the microprocessor 71 loads and runs the instructions of these algorithms.

The random access memory 73 notably comprises:
in a register, the operating programme of the microprocessor 71 responsible for switching on the telecommunication device 7,
reception parameters (for example parameters for modulation, encoding, MIMO, recurrence of frames),
transmission parameters (for example parameters for modulation, encoding, MIMO, recurrence of frames),
incoming data corresponding to the data received and decoded by the receiver 76,
decoded data formed to be transmitted at the interface to the application 75,
parameters of the camera lens and/or reference pixels of each micro-image.

Other structures of the telecommunication device 7 than those described with respect to FIG. 7 are compatible with the present disclosure. In particular, according to variants, the telecommunication device may be implemented according to a purely hardware realisation, for example in the form of a dedicated component (for example in an ASIC (Application Specific Integrated Circuit) or FPGA (Field-Programmable Gate Array) or VLSI (Very Large Scale Integration) or of several electronic components embedded in an apparatus or even in a form of a mix of hardware elements and software elements.

The radio interface 76 and the interface 75 are adapted for the reception and transmission of signals according to one or several telecommunication standards such as IEEE 802.11 (Wi-Fi), standards compliant with the IMT-2000 specifications (also called 3G), with 3GPP LTE (also called 4G), IEEE 802.15.1 (also called Bluetooth) . . . .

According to a variant, the telecommunication device does not include any ROM but only RAM, the algorithms implementing the steps of the method specific to the present disclosure being stored in the RAM.

Naturally, the present disclosure is not limited to the embodiments previously described.

In particular, the present disclosure is not limited to a plenoptic camera but also extends to a lens unit (also called plenoptic optical assembly) comprising the camera lens and the LED.

Telecommunication devices includes, for example, smartphones, smartwatches, tablets, computers, mobile phones, portable/personal digital assistants ("PDAs"), and other devices that facilitate communication of information between end-users but also set-top-boxes.

The method of calibrating the plenoptic camera described herein may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A plenoptic camera comprising a camera lens, a lenslet array comprising a plurality of microlenses and a photosensor array, the plenoptic camera further comprising:
a light emitting device arranged in an aperture stop plane of the camera lens, the light emitting device lighting said photosensor array;
a processor associated with a memory configured to determine a reference pixel of a micro-image associated with each microlens of said plurality of microlenses from at least one photosensor lit by said light emitting device, the reference pixel corresponding to a photosensor of said at least one photosensor receiving a maximum intensity of light from said light emitting device.

2. The plenoptic camera according to claim 1, wherein the light emitting device is arranged at the centre of said aperture stop plane.

3. The plenoptic camera according to claim 1, wherein the light emitting device is transparent.

4. The plenoptic camera according to claim 1, further comprising a module for detecting a change of a focal length of said camera lens and/or a change of a focusing distance occurring when zooming or focalizing.

5. The plenoptic camera according to claim 4, wherein the detecting of a change triggers lighting said photosensor array by said light emitting device.

6. The plenoptic camera according to claim 1, wherein the light emitting device lights said photosensor array during at least a part of at least an image acquisition cycle.

7. The plenoptic camera according to claim 1, wherein said light emitting device emits white light.

8. The plenoptic camera according to claim 1, wherein said light emitting device emits red light, green light and blue light successively.

9. The plenoptic camera according to claim 1, wherein said light emitting device is a light-emitting diode.

10. The plenoptic camera according to claim 1, wherein said processor is further configured to determine the photosensors lit by said light emitting diode by measuring light intensity received by each photosensor of the photosensor array, the determined photosensors corresponding to the photosensors for which the measured light intensity is maximal.

11. The plenoptic camera according to claim 1, wherein said reference pixel is the centre pixel of said micro-image.

12. A method of determining reference pixels in a plenoptic camera comprising a camera lens, a lenslet array comprising a plurality of microlenses and a photosensor array, characterized in that the method comprises:
lighting said photosensor array with a light emitting device arranged in an aperture stop plane of the camera lens,
determining a reference pixel of a micro-image associated with each microlens of said plurality of microlenses from photosensors at least one photosensor of said photosensor array lit by said light emitting device, the reference pixel corresponding to a photosensor of said at least one photosensor receiving a maximum intensity of light from said light emitting device.

13. A method of determining reference pixels in a plenoptic camera comprising a camera lens, a lenslet array comprising a plurality of microlenses and a photosensor array, characterized in that the method comprises:
lighting said photosensor array with a light emitting device arranged in an aperture stop plane of the camera lens,
determining a reference pixel of a micro-image associated with each microlens of said plurality of microlenses from photosensors of said photosensor array lit by said light emitting device,
detecting a change of a focal length of said camera lens and/or a change of a focusing distance occurring when zooming or focalizing, said lighting being triggered by said detecting.

14. The method according to claim 13, wherein said photosensor array is lit during at least a part of at least an image acquisition cycle.

15. The method according to claim 13, wherein said determining of a reference pixel comprises determining said photosensors at least one photosensor lit by said light emitting device measuring light intensity received by each photosensor of the photosensor array, the determined photosensors corresponding to the photosensors for which the measured light intensity is maximal.

16. The method according to claim 13, wherein said reference pixel corresponds to the centre pixel of said micro-image.

17. The method according to claim 13, wherein said light emitting device emits white light.

18. The method according to claim 13, wherein said light emitting device emits red light, green light and blue light successively.

19. The method according to claim 13, wherein said light emitting device is a light-emitting diode.

* * * * *